US012747807B2

(12) United States Patent
Eilers et al.

(10) Patent No.: US 12,747,807 B2
(45) Date of Patent: Sep. 29, 2026

(54) VALVE CAGES HAVING LATTICE STRUCTURE

(71) Applicant: Fisher Controls International LLC, Marshalltown, IA (US)

(72) Inventors: Daniel Eilers, Marshalltown, IA (US); Hang Li, Tianjin (CN); Shannon Jelken, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/032,467

(22) PCT Filed: Mar. 15, 2023

(86) PCT No.: PCT/CN2023/081559
§ 371 (c)(1),
(2) Date: Apr. 18, 2023

(87) PCT Pub. No.: WO2024/187399
PCT Pub. Date: Sep. 19, 2024

(65) Prior Publication Data
US 2025/0389346 A1 Dec. 25, 2025

(51) Int. Cl.
*F16K 47/12* (2006.01)
*F16K 47/02* (2006.01)

(52) U.S. Cl.
CPC .............. *F16K 47/12* (2013.01); *F16K 47/02* (2013.01)

(58) Field of Classification Search
CPC .......... F16K 47/12; F16K 47/02; F16K 47/06; F16K 47/14; Y10T 137/7914
See application file for complete search history.

(56) References Cited

U.S. PATENT DOCUMENTS 3,780,767 A * 12/1973 Borg ........................ F16K 47/08 137/625.37
4,456,033 A * 6/1984 Kay ........................ F16K 47/08 137/625.37
5,014,746 A * 5/1991 Heymann ............... F16K 47/08 137/625.3

(Continued)

FOREIGN PATENT DOCUMENTS

CN 101454600 A 6/2009
CN 107975605 A 5/2018

(Continued)

OTHER PUBLICATIONS

Translation of WO2017018173 retrieved from espacenet.com Mar. 26, 2026. (Year: 2026).*

(Continued)

*Primary Examiner* — Jessica Cahill
(74) *Attorney, Agent, or Firm* — Hanley, Flight & Zimmerman, LLC

(57) ABSTRACT

Valve cages having lattice structure are disclosed herein. An example cage includes a first end portion, a second end portion opposite the first end portion, and a wall between the first end portion and the second end portion. The wall includes a skeleton frame having a plurality of frame walls extending between the first end and the second end portion. The skeleton frame defines a plurality of windows. The wall also includes lattice structure in the windows.

15 Claims, 16 Drawing Sheets

(56) References Cited

U.S. PATENT DOCUMENTS

| | | | | |
|---|---|---|---|---|
| 8,033,300 | B2 * | 10/2011 | McCarty | F16K 47/08 137/625.3 |
| 8,141,586 | B2 * | 3/2012 | Stepanov | F16K 47/10 137/625.33 |
| 10,487,961 | B2 * | 11/2019 | Eilers | B33Y 80/00 |
| 11,156,241 | B2 | 10/2021 | Eilers et al. | |
| 2007/0272316 | A1 * | 11/2007 | Zecchi | G05D 16/0658 137/625.33 |
| 2013/0320252 | A1 * | 12/2013 | Hageman | F16K 47/08 251/324 |
| 2014/0366970 | A1 * | 12/2014 | Griffin | F16K 3/0209 137/625.3 |
| 2015/0108379 | A1 * | 4/2015 | Juhnke | F16K 47/08 251/127 |
| 2018/0112800 | A1 * | 4/2018 | Griffin, Jr | F16K 47/08 |
| 2021/0278005 | A1 * | 9/2021 | Alman | F16K 27/04 |
| 2022/0325823 | A1 | 10/2022 | Eilers et al. | |

FOREIGN PATENT DOCUMENTS

| | | | |
|---|---|---|---|
| CN | 109578597 | A | 4/2019 |
| CN | 1115405714 | A | 11/2022 |
| WO | 2017018173 | A1 | 2/2017 |

OTHER PUBLICATIONS

International Searching Authority, "International Search Report," mailed in connection with International Patent Application No. PCT/CN2023/081559, on Nov. 8, 2023, 4 pages.

International Searching Authority, "Written Opinion of the International Searching Authority," mailed in connection with International Patent Application No. PCT/CN2023/081559, on Nov. 8, 2023, 3 pages.

* cited by examiner

VALVE CAGES HAVING LATTICE STRUCTURE

FIELD OF THE DISCLOSURE

This disclosure relates generally to valves and valve components and, more particularly, to valve cages having lattice structure.

BACKGROUND

Valves are commonly used in process control systems to control the flow of process fluids (e.g., water, gas, etc.). Sliding stem valves (e.g., a gate valve, a globe valve, a diaphragm valve, a pinch valve, etc.) typically have a closure member (e.g., a valve plug) disposed in a fluid passageway of the valve. A valve stem operatively couples the closure member to an actuator to move the closure member between an open position and a closed position to allow or restrict fluid flow between an inlet and an outlet of the valve. Additionally, to provide desired and/or to achieve certain flow characteristics of the fluid, valves often employ a cage interposed in the fluid passageway. The closure member is disposed in and moveable in the cage. The cage may be used to reduce flow capacity, attenuate noise, and/or reduce or eliminate cavitation.

SUMMARY

An example cage for a valve includes a first end portion, a second end portion opposite the first end portion, and a wall between the first end portion and the second end portion. The wall includes a skeleton frame having a plurality of frame walls extending between the first end and the second end portion. The skeleton frame defines a plurality of windows. The wall of the cage also includes lattice structure in the windows.

An example valve includes a valve body defining a fluid passageway between an inlet and an outlet, a plug, and a cage in the fluid passageway. The plug is disposed in the cage. The plug is moveable in the cage to control fluid flow through the fluid passageway. The cage includes a first end portion, a second end portion, and a wall between the first end portion and the second end portion. The wall includes lattice structure and a skeleton frame with a plurality of frame walls extending into the lattice structure. The skeleton frame has a smaller inner diameter than the lattice structure.

An example method includes constructing, via an additive manufacturing process, a cage for a valve. The cage includes first end portion, a second end portion opposite the first end portion, and a wall between the first end portion and the second end portion. The wall includes a skeleton frame extending between the first end portion and the second end portion and defining a plurality of windows. The wall includes lattice structure in the windows.

BRIEF DESCRIPTION OF THE DRAWINGS

In general, the same reference numbers will be used throughout the drawing(s) and accompanying written description to refer to the same or like parts. The figures are not to scale.

Figure 1:
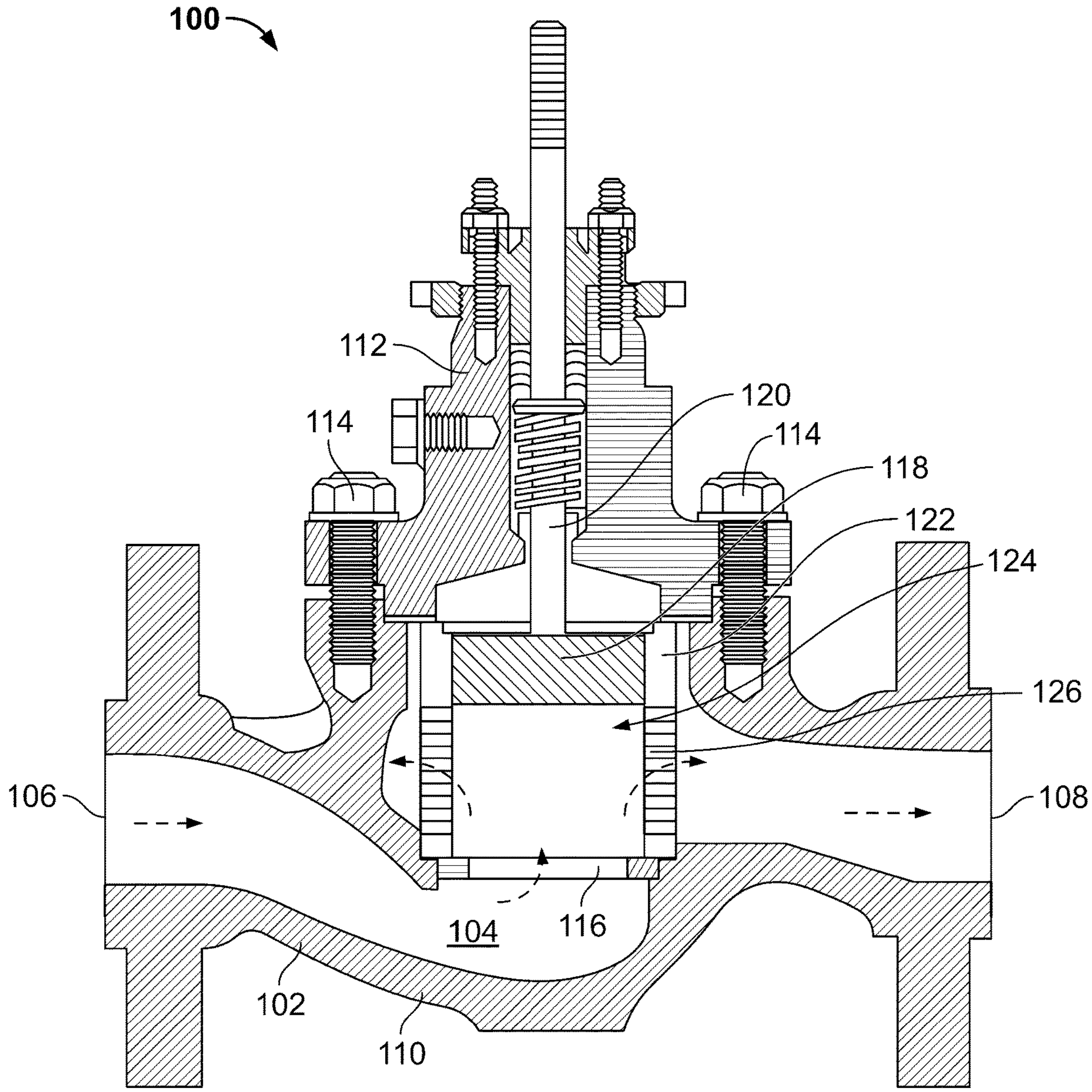
FIG. 1 is a cross-sectional view of an example valve in which example cages disclosed herein can be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Many known process control and/or fluid distribution systems (e.g., power generation systems, petroleum refinery systems, etc.) employ process control devices to affect the flow of fluid. For example, valves are a common type of process control device that are used to control the flow of fluid (e.g., liquids, gases, etc.) between an upstream source and a downstream location. Some known valves, such as sliding-stem valves (e.g., globe valves) include a plug that is moveable relative to a seat (e.g., a seal) between an open position and a closed position. When the plug is in the opened position, the plug is disengaged from the seat and allows fluid to flow from an inlet of the valve to an outlet of the valve. When the plug is in the closed position, the plug is engaged with the seat and prevents fluid flow between the inlet and the outlet. Opening and closing of the valve can be performed manually or via a command signal that controls an actuator to move the plug.

When the valve is in the open position, the restriction of the flow through the valve increases the velocity of the fluid but decreases the pressure of the fluid. If the pressure falls below the vapor pressure of the fluid, vapor bubbles are formed. When the pressure recovers downstream, these vapor bubbles implode, causing high pressure waves. This phenomenon, referred to as "cavitation," can cause significant damage to the valve and downstream piping in the form of erosion. Damage to the valve due to cavitation can cause the valve to lose its sealing capacity. Furthermore, cavitation can result in other adverse effects such as loud noise and strong vibrations.

Noise can also be generated from the use of valves and other control valves due to turbulent flow. As the fluid flows through the restriction of an open valve, its velocity increases while its pressure decreases. As high-velocity fluid exits the valve, the high-velocity fluid interacts with relatively stationary or low velocity fluid at the outlet of the valve. The interaction of fluids occurs at a shear layer between the high-velocity fluid and the stationary or low velocity fluid. In such cases, noise is caused in the shear layer by turbulent pressure fluctuations.

In some examples, a valve may be equipped with a trim assembly including a cage to control the noise and cavitation of the fluid flowing through the valve. The cage is a cylinder or sleeve-shaped structure that is disposed in the fluid passageway. The plug is disposed in and moveable (e.g., slidable) in the cage. The cage has openings (e.g., holes, slots, etc.) through which the fluid travels when the plug is in the open (or partially open) position. The cage reduces noise caused by the flowing fluid. Furthermore, the cage reduces or isolates the damage from cavitation. Openings in the cage through which the fluid travels result in jet separation of the fluid traveling through the valve. Cavitation is isolated by directing fluid into the center of the valve using a flow down orientation so that bubbles implode away from the valve components, thus minimizing damage to valve components.

Disclosed herein are example cages having walls constructed at least partially of lattice structure. Lattice structure includes a network of voids that form or define openings (flow paths) through the cage wall. The use of lattice structure enables the formation of relatively small diameter openings (e.g., 1⁄16 inch or less) in the cage wall for fluid flow. Smaller diameter openings create noise composed of higher acoustic frequencies than larger diameter openings. Human hearing is in the range of 20-20,000 hertz (Hz). Therefore, using smaller diameter openings tends to shift the noise frequency to frequencies that are less audible or not audible at all to the human ear. As such, the use of the lattice structure helps to significantly reduce noise generated by the flowing fluid. The openings can be sized based on the application needs to achieve the desired noise attenuation, cavitation reduction, flow capacity, and other parameters.

The example cages disclosed herein also include example skeleton frames in the cage walls. An example skeleton frame includes a plurality of frame walls arranged in a certain pattern to form a plurality of windows (e.g., larger openings). The lattice structure is formed in each of the windows. Said another way, the skeleton frame extends at least partially into (in a radial direction) the lattice structure. The skeleton frame has a smaller inner diameter than the lattice structure. As such, the skeleton frame forms an inner guiding surface along which the plug slides. Therefore, the plug does not slide or contact the lattice structure. As a result, the lattice structure does not need to be machined or smoothed. Machining or smoothing the lattice structure can sometimes clog the openings, which complicates the manufacturing and machining processes. Therefore, using the skeleton frame to provide the guiding surface reduces manufacturing time and costs. Further, the skeleton frame provides strength to the cage, which reduces loads on the lattice during manufacture, assembly, and operation of the valve. Disclosed herein are example skeleton frames having different patterns or arrangements of the frame walls, such as helical and polygonal. The frame walls define a repeating pattern of windows, which may have different shapes depending on the arrangement of the frame walls.

The example skeleton frames disclosed herein also reduce undesired clearance flow and up-flow through the cage. The skeleton frame has a smaller inner diameter than the lattice, which can be machined to have a relatively small tolerance between the plug and cage. For instance, when the plug is in a partially open position, the bottom of the plug may be aligned with a center of one of the windows. As such, some of the fluid may flow between the plug and the lattice structure and upward along the gap between the plug and the lattice structure. However, the frame walls of the skeleton frame prevent the flow from moving into other windows above the bottom of the plug. As a result, the frame walls of the skeleton frame reduce or limit clearance flow. Further, the skeleton frame can extend radially through the lattice structure, which reduces the flow from moving upwards while moving radially through the cage, sometimes referred to as up-flow. For instance, when the plug is in a partially open position, the bottom of the plug may be aligned near the top of one of the windows. The frame walls of the skeleton frame prevent or limit the flow moving radially through the cage from also moving upwards into the windows above the bottom of the plug.

In some examples disclosed herein, the cages are constructed via an additive manufacturing process, sometimes referred to as three-dimensional (3D) printing. As used herein, additive manufacturing or 3D printing refers to a manufacturing process that builds a 3D object by adding successive adjacent layers of material. The layers fuse together (e.g., naturally or via a subsequent fusing process) to form the 3D object. The material may be any material, such as plastic, metal, concrete, etc. Examples of additive manufacturing include Stereolithography (SLA), Selective Laser Sintering (SLS), fused deposition modeling (FDM), and multi-jet modeling (MJM). 3D printing is advantageous because it results in less wasted material than known machining operations. Therefore, 3D printing the cages results in a relatively lower cost cage. Further, 3D printing is advantageous because it can be used to form high density features, such as the lattice structure that forms the small openings (flow paths), which may not be feasible with other known machining processes.

FIG. 1 is a cross-sectional view of an example valve 100 constructed in accordance with the teachings of this disclosure. The valve 100 can be used to control the flow of a fluid, such as liquid or gas. The valve 100 is a type of sliding stem valve, such as a globe valve. In other examples, the valve 100 can be implemented as another type of valve.

In the illustrated example, the valve 100 includes a valve body 102 defining a fluid passageway 104 between an inlet 106 and an outlet 108. The valve body 102 can be coupled between two pipes and used to control the flow of fluid between an upstream source and a downstream area. In some examples, the valve body 102 include multiple body portions that are coupled together. For example, in FIG. 1, the valve body 102 has a first body portion 110 and a second body portion 112 (sometimes referred to as a bonnet) coupled to the first body portion 110. In the illustrated example, the second body portion 112 is coupled to the first body portion 110 via one or more threaded fasteners 114 (e.g., bolts).

In the illustrated example, the valve 100 includes an example seat 116 disposed in the fluid passageway 104. The valve 100 also includes an example valve plug 118. In some examples, the plug 118 is a balanced plug. The valve 100 includes an example stem 120 that extends through the second body portion 112 and is coupled to the plug 118 in the fluid passageway 104. The stem 120 can be coupled to an actuator (e.g., a pneumatic actuator, etc.) or a hand-operated device (e.g., a handwheel). In operation, the actuator moves the stem 120 up and down to move the valve plug 118 between an open position and a closed position. In the open position, which is the position shown in FIG. 1, the plug 118 is spaced from the seat 116, which allows fluid flow through the fluid passageway 104 between the inlet 106 and the outlet 108. In the closed position, the plug 118 is engaged with the seat 116, thereby forming a seal, which prevents fluid flow through the seat 116 and, thus, through the fluid passageway 104 between the inlet 106 and the outlet 108.

In the illustrated example, the valve 100 includes an example cage 122 disposed in the fluid passageway 104. In this example, the cage 122 is cylindrical or sleeve-shaped. The cage 122 defines a central bore or channel 124. The plug 118 is disposed in the channel 124 of the cage 122. The plug 118 is moveable (e.g., slidable) up and down in the channel 124 of the cage 122 to control fluid flow through the fluid passageway 104. The cage 122 has a wall 126 with a plurality of openings. When the plug 118 is in the open position (or partially open position), fluid flows through the seat 116, into the channel 124, and through one or more of the openings in the wall 126 of the cage 122 to the outlet 108, as shown by the dotted arrow lines. The size, shape, and/or layout of the openings can be designed to reduce noise and cavitation. When the plug 118 is in the closed position, the plug 118 engages the seat 116, which blocks the flow of fluid into the channel 124 of the cage 122.

In the illustrated example, the cage 122 is coupled to the valve body 102. In some examples, the cage 122 is clamped between two portions of the valve body 102. For example, to install the cage 122, the second body portion 112 is detached from the first body portion 110, the cage 122 is inserted into the fluid passageway 104, and then second body portion 112 is re-attached to the first body portion 110, which clamps the cage 122 between the first and second body portions 110, 112. In other examples, the cage 122 can be coupled to the valve body 102 in other manners.

Figure 2:
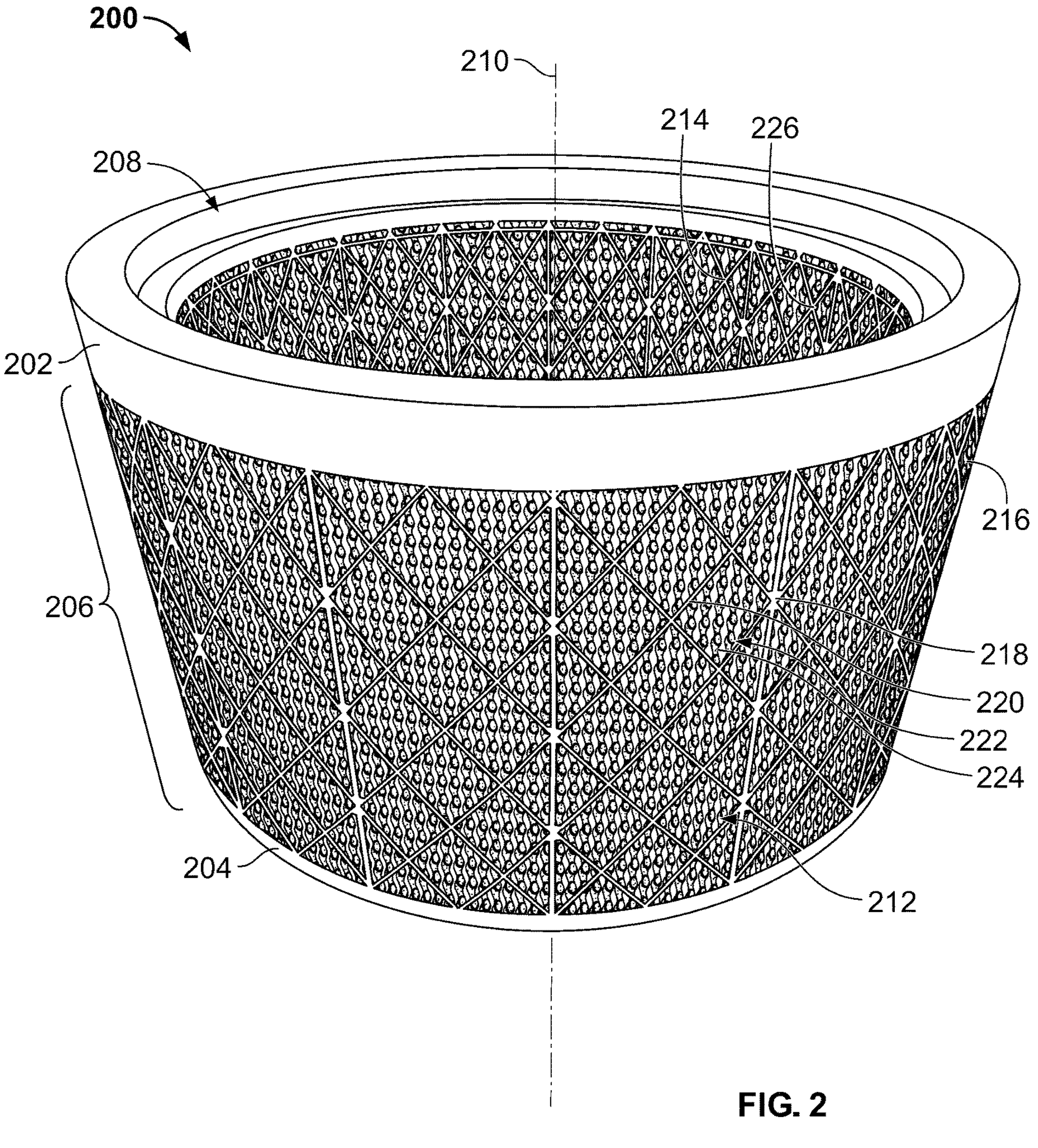
FIG. 2 is a perspective view of an example cage having an example lattice structure and an example skeleton frame with helical frame walls.

FIG. 2 is a perspective view of an example cage 200 constructed in accordance with the teachings of this disclosure. The example cage 200 can be implemented as the example cage 122 in the example valve 100 of FIG. 1. The cage 200 has multiple parts or sections, as disclosed in further detail herein. In some examples, the entire cage 200 is constructed as a single unitary part or component (e.g., a monolithic structure). However, in other examples, the cage 200 can be constructed as separate parts or sections that are coupled together (e.g., via welding, fasteners, etc.) during an assembly process.

In the illustrated example, the cage 200 includes a first end portion 202, a second end portion 204 opposite the first end portion 202, and a wall 206 between the first end portion 202 and second end portion 204. Depending on the orientation of the cage 200, the first and second end portions 202, 204 may be referred to as upper and lower end portions. The cage 200 has a central channel 208 between the first and second end portions 202, 204. The plug 118 (FIG. 1) is to be disposed in the central channel 208. In this example, the cage 200 is cylindrical and has a central axis 210. As used herein, the terms "axial" and "longitudinal" both refer to a direction parallel to the central axis 210, "radial" refers to a direction perpendicular to the axial direction, and "tangential" or "circumferential" refers to a direction mutually perpendicular to the axial and radial directions.

In the illustrated example, the first and second end portions 202, 204 are solid material, while the wall 206 has a plurality of openings 212 (one of which is reference in FIG. 2). In particular, the wall 206 has an inner side 214 and an outer side 216. The openings 212 are formed through the wall 206 between the inner side 214 and the outer side 216. The openings 212 define flow paths for fluid to flow through the wall 206 of the cage 200. In some examples, the first and second end portions 202, 204 and the wall 206 are constructed of the same material, such as metal. In some examples, the cage 200 is constructed via an additive manufacturing process, sometimes referred to as 3D printing. For example, the cage 200 can be 3D printed as a single unitary part or component by fusing multiple layers of material together.

Figure 3:
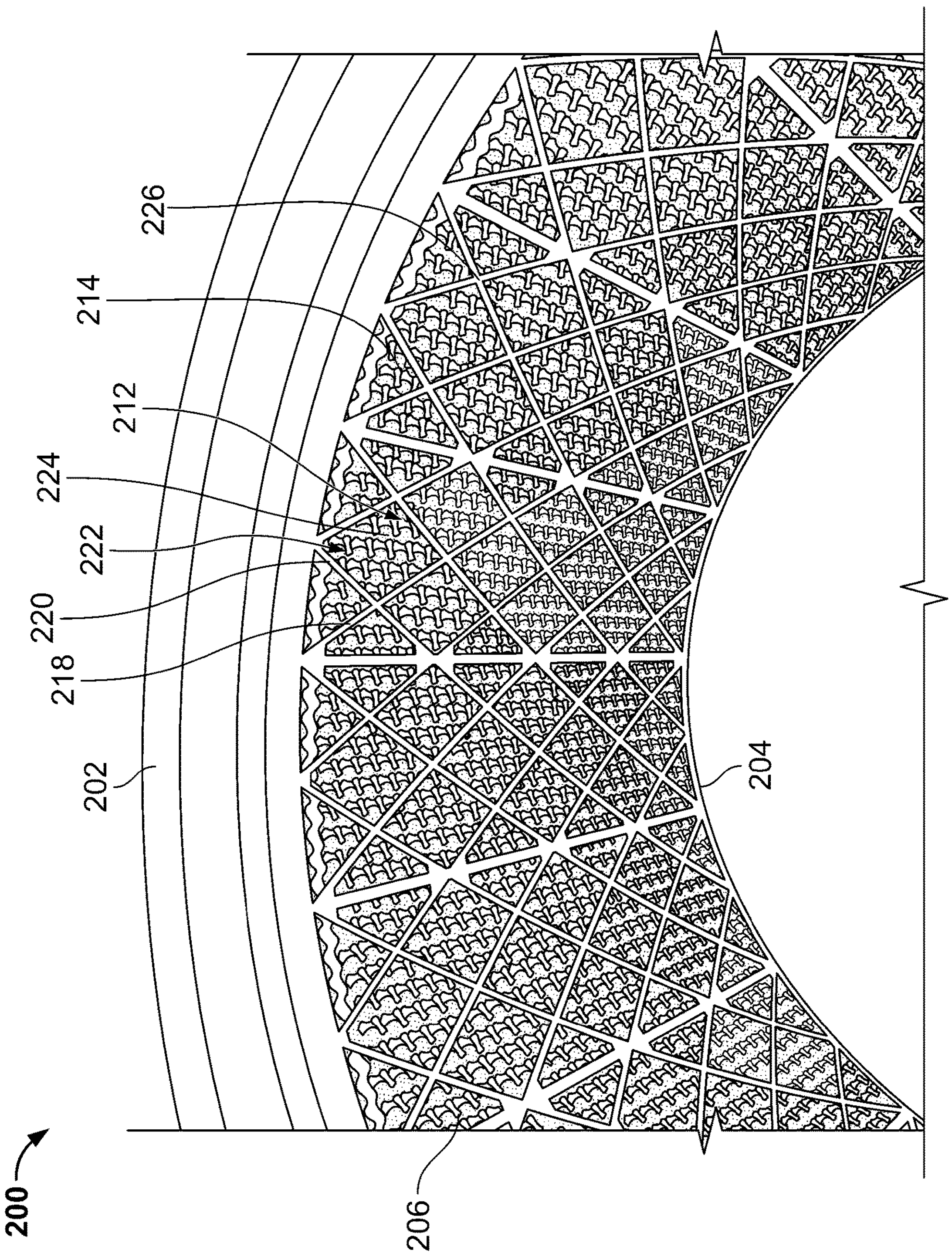
FIG. 3 is enlarged view of an inner surface of the example cage of FIG. 2.

FIG. 3 is an enlarged view of the inner side 214 of the cage 200. FIGS. 2 and 3 are described together herein. As shown in FIGS. 2 and 3, the wall 206 of the cage 200 includes a skeleton frame 218 extending between the first and second end portions 202, 204. The skeleton frame 218 includes a plurality of frame walls 220 (one of which is referenced in FIGS. 2 and 3) extending between the first and second end portions 202, 204. The frame walls 220 can be arranged in various patterns, disclosed in further detail herein. The frame walls 220 are solid material (e.g., steel). The frame walls 220 of the skeleton frame 218 form or define a plurality of openings 222, referred to herein as windows 222. One of the example windows 222 is labeled in each of FIGS. 2 and 3. In this example, the frame walls 220 are arranged such that the windows 222 have a rhombus shape (which may also be referred to as a diamond shape). In other examples, the windows 222 can be shaped differently, examples of which are disclosed in further detail herein. The skeleton frame 218 has many advantages, such as providing a guide surface for the plug 118 (FIG. 1), providing strength to the cage 200, and reducing (e.g., minimizing) clearance flow.

Figure 4C:
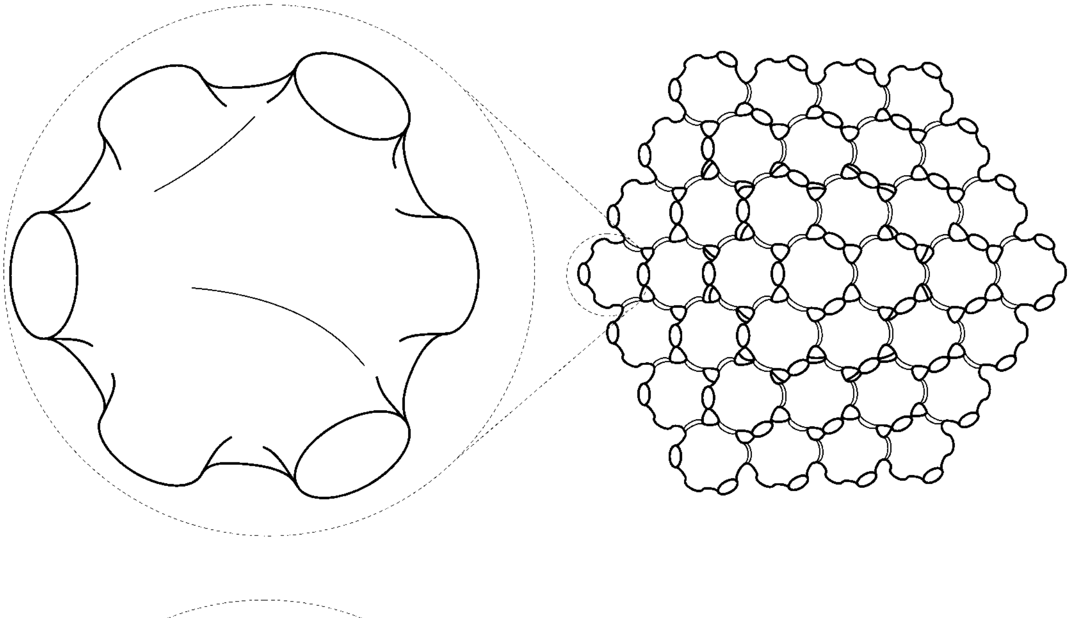
FIGS. 4A, 4B, and 4C illustrate example lattice structures that can be used in the example cage of FIG. 2.
Figure 4B:
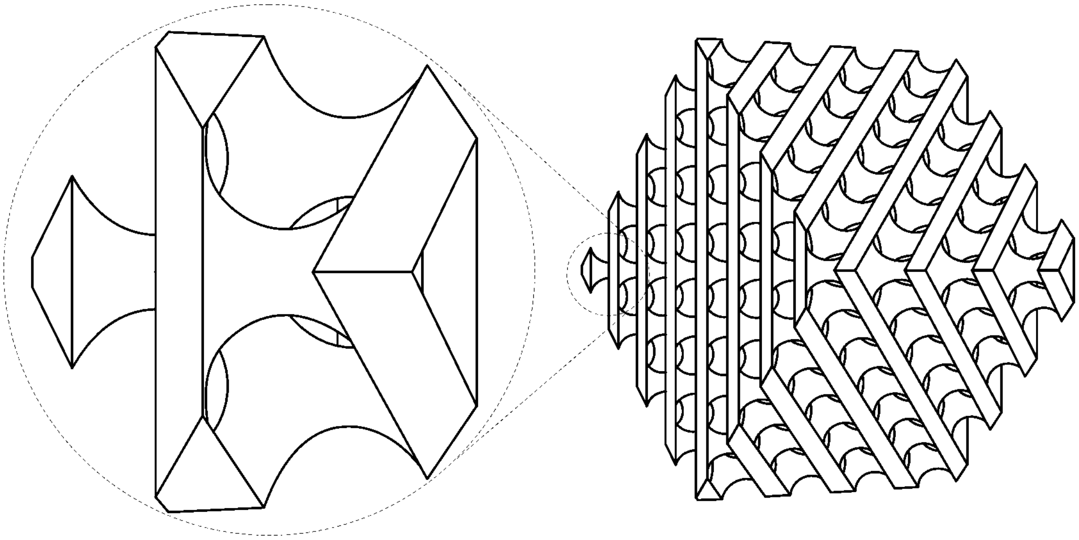
Figure 4A:
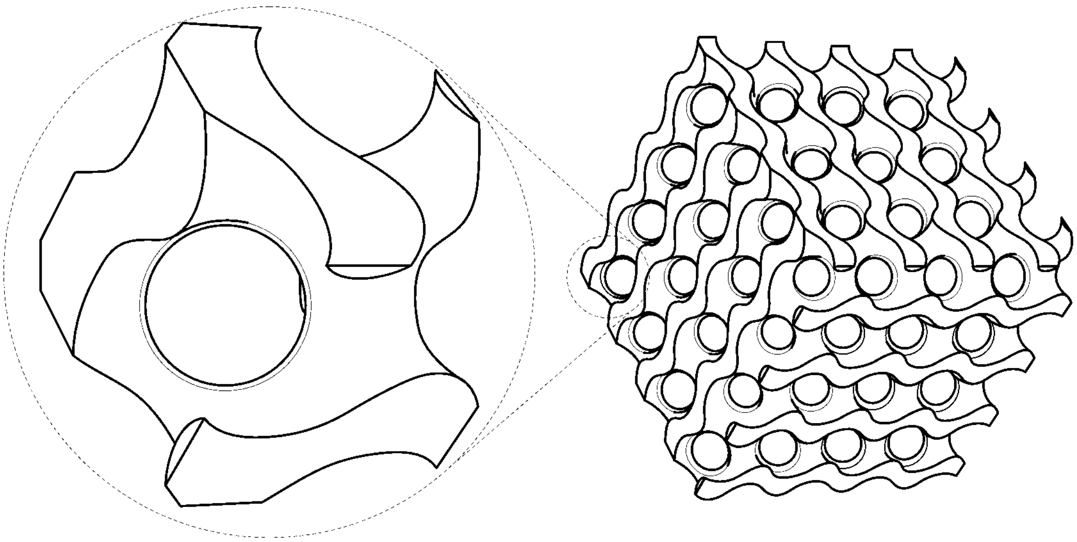

In the illustrated example of FIGS. 2 and 3, the wall 206 includes lattice structure 224 (referenced once in each of FIGS. 2 and 3) in the windows 222. In particular, the lattice structure 224 is formed or constructed between the frame walls 220 in each of the windows 222. The lattice structure 224 forms the openings 212 through the wall 206. In particular, the lattice structure 224 has small, interconnected cells or voids that form the openings 212 and thereby define fluid passageways through the wall 206 of the cage 200. In some examples, the lattice structure 224 is a triply periodic lattice structure (sometimes referred to as triply periodic minimal surface (TPMS) lattice structure). FIGS. 4A, 4B, and 4C illustrate three examples of triply periodic lattice structures that can be implemented as the lattice structure 224. FIG. 4A shows an example lattice structure having gyroid-shaped cells, FIG. 4B shows an example lattice having diamond-shaped cells, and FIG. 4C shows an example lattice having primitive-shaped cells. The cell size and volume fraction of the lattice structure can be configured based on the desired flow characteristics. In some examples, the lattice can be graded, such that for low flow capacity, the lattice can have a high volume fraction, and for higher flow capacity, the lattice can have lower volume fraction.

Referring back to FIGS. 2 and 3, the skeleton frame 218 has a smaller inner diameter than the lattice structure 224. In other words, an inner surface 226 of the skeleton frame 218 extends radially inward further than the lattice structure 224. Therefore, the inner surface 226 of the skeleton frame 218 forms a guide or sliding surface along which the plug 118 can slide in the cage 200. As such, the plug 118 does not engage or slide against the lattice structure 224. As a result, the lattice structure 224 does not need to be machined or smoothed, which reduces manufacturing time and costs. The skeleton frame 218 also provide strength to the cage 200.

Figure 11:
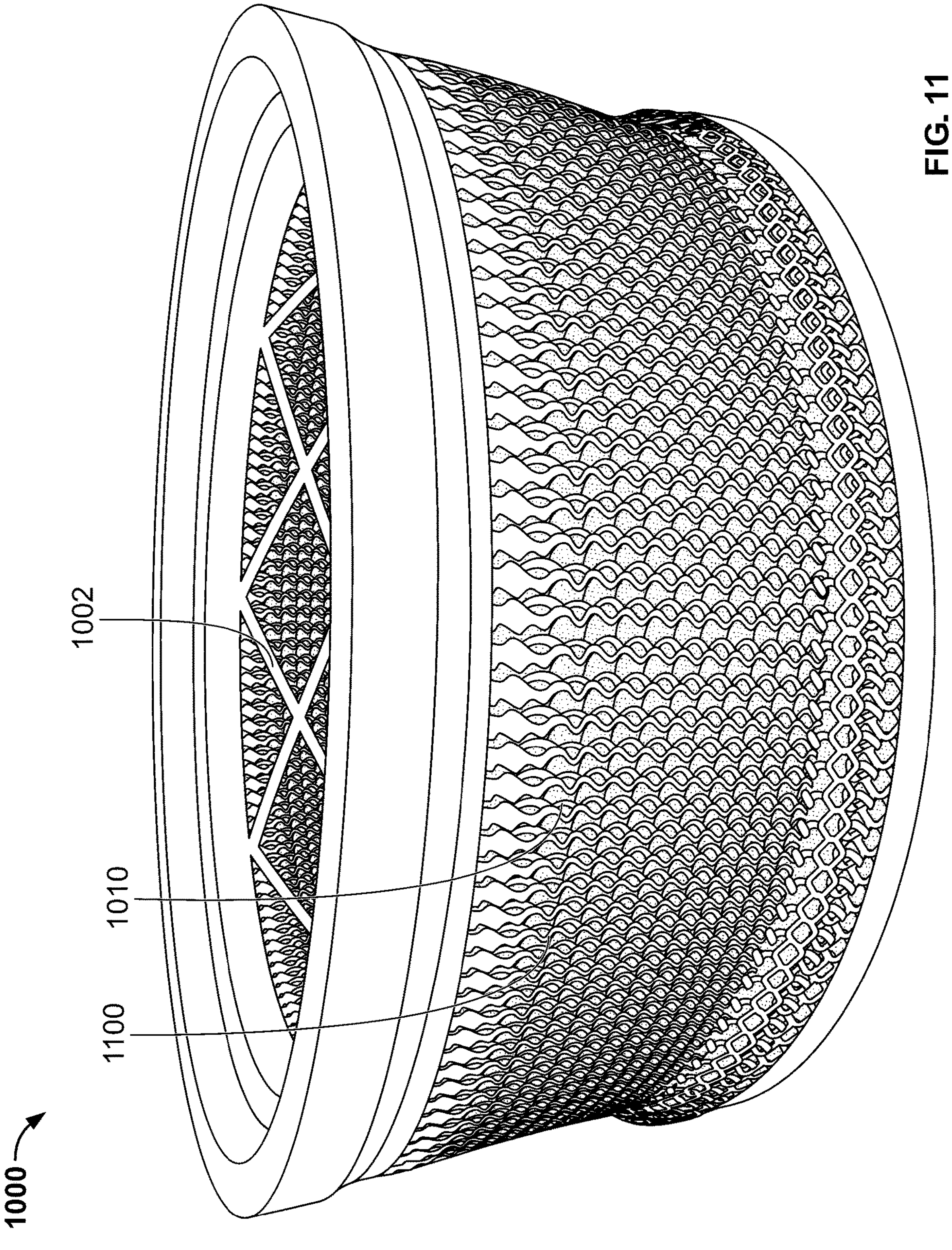
FIG. 11 is an outside view of an example cage in which the example skeleton frame does not extend through the example lattice structure.

Therefore, the wall 206 can be considered as being formed by the skeleton frame 218 extending between the first and second end portions 202, 204, with the lattice structure 224 in the windows 222 of the skeleton frame 218. In other examples, the wall 206 can be considered as being formed by the lattice structure 224 extending between the first and second end portions 202, 204, with the skeleton frame 218 extending at least partially into (in the radial direction) the lattice structure 224. In some examples, the skeleton frame 218 extends completely through the lattice structure 224. However, in other examples, the skeleton frame 218 only extends partially into the lattice structure 224, an example of which is shown in FIG. 11.

Figure 5:
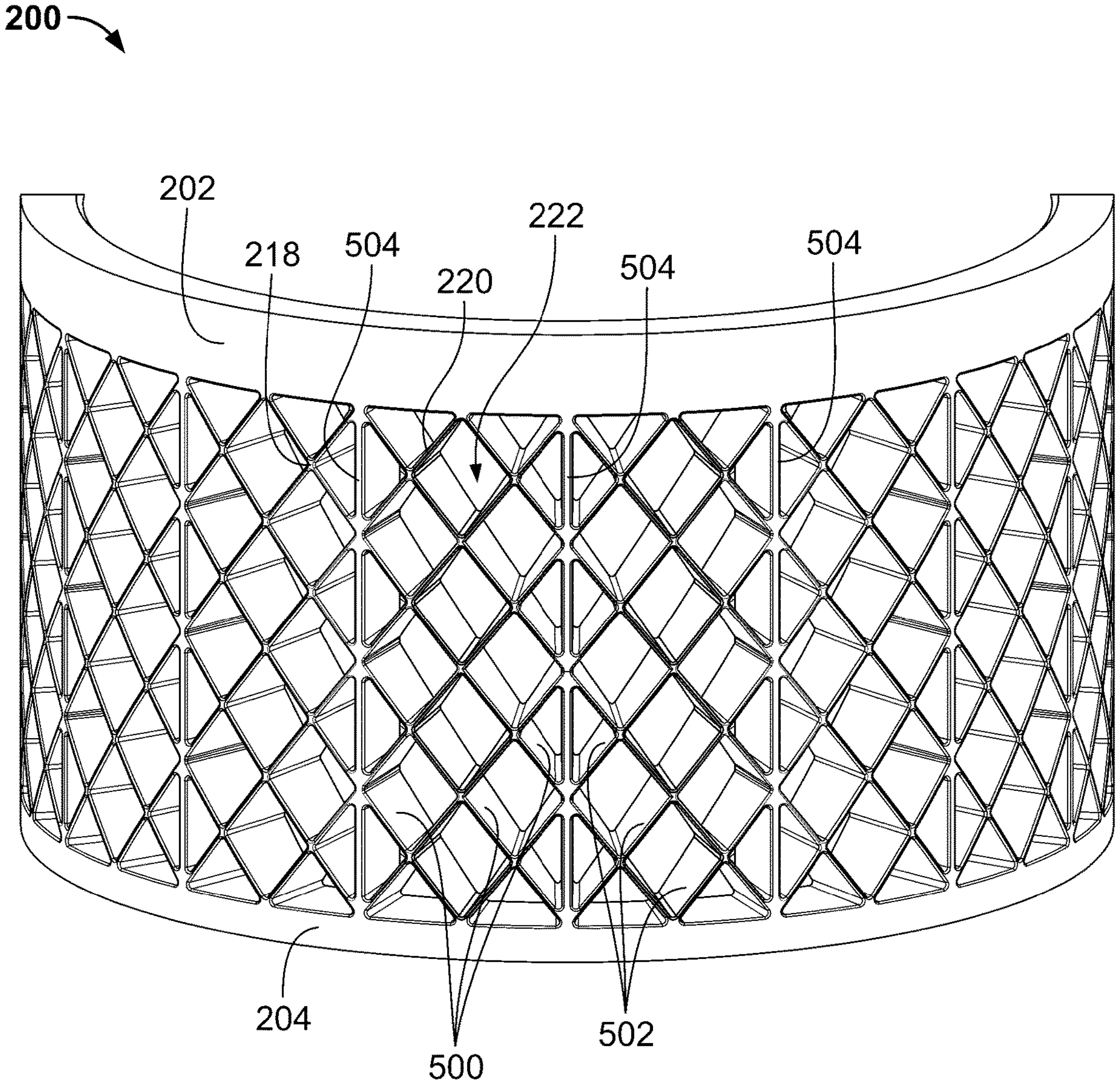
FIG. 5 is a side view of a portion of the example cage of FIG. 2 without the lattice structure.

FIG. 5 is a side view of a portion of the cage 200 showing the skeleton frame 218 without the lattice structure 224. In this example, at least some of the frame walls 220 (one of which is referenced in FIG. 5) of the skeleton frame 218 are helically arranged. For example, the frame walls 220 include a first set of frame walls 500 (three of which are referenced in FIG. 5) extending between the first and second end portions 202, 204 and a second set of frame walls 502 (three of which are referenced in FIG. 5) extending between the first and second end portions 202, 204. The first set of frame walls 500 are arranged in a helical pattern angled in a first direction and the second set of frame walls 502 are arranged in a helical pattern angled in a second direction and intersecting the first set of frame walls 500. The first set of frame walls 500 are spaced equidistant from each other, and the second set of frame walls 502 are spaced equidistant from each other. As such, as shown in FIG. 5, at least a portion of the windows 222 are rhombus-shaped.

In the illustrated example, the frame walls 220 of the skeleton frame 218 also include a third set of frame walls 504 (three of which are referenced in FIG. 5) extending between the first and second end portions 202, 204. The third set of frame walls 504, which may also be referred to as vertical walls, are oriented or arranged in an axial direction (e.g., a longitudinal direction, a vertical direction). The third set of frame walls 504 intersect at least some of the first and second sets of frame walls 500, 502.

The third set of frame walls 504 divide certain ones of the rhombus-shaped windows into triangular-shaped windows. In the illustrated example, the third set of frame walls 504 are spaced equidistant from each other around the cage 200. This arrangement of the frame walls 220 provides strength to the cage 200, which undergoes loading during manufacture and operation of the valve 100. In other examples, the frame walls 500, 502, 504 can be arranged in other patterns, examples of which are disclosed in further detail herein.

Figure 6:
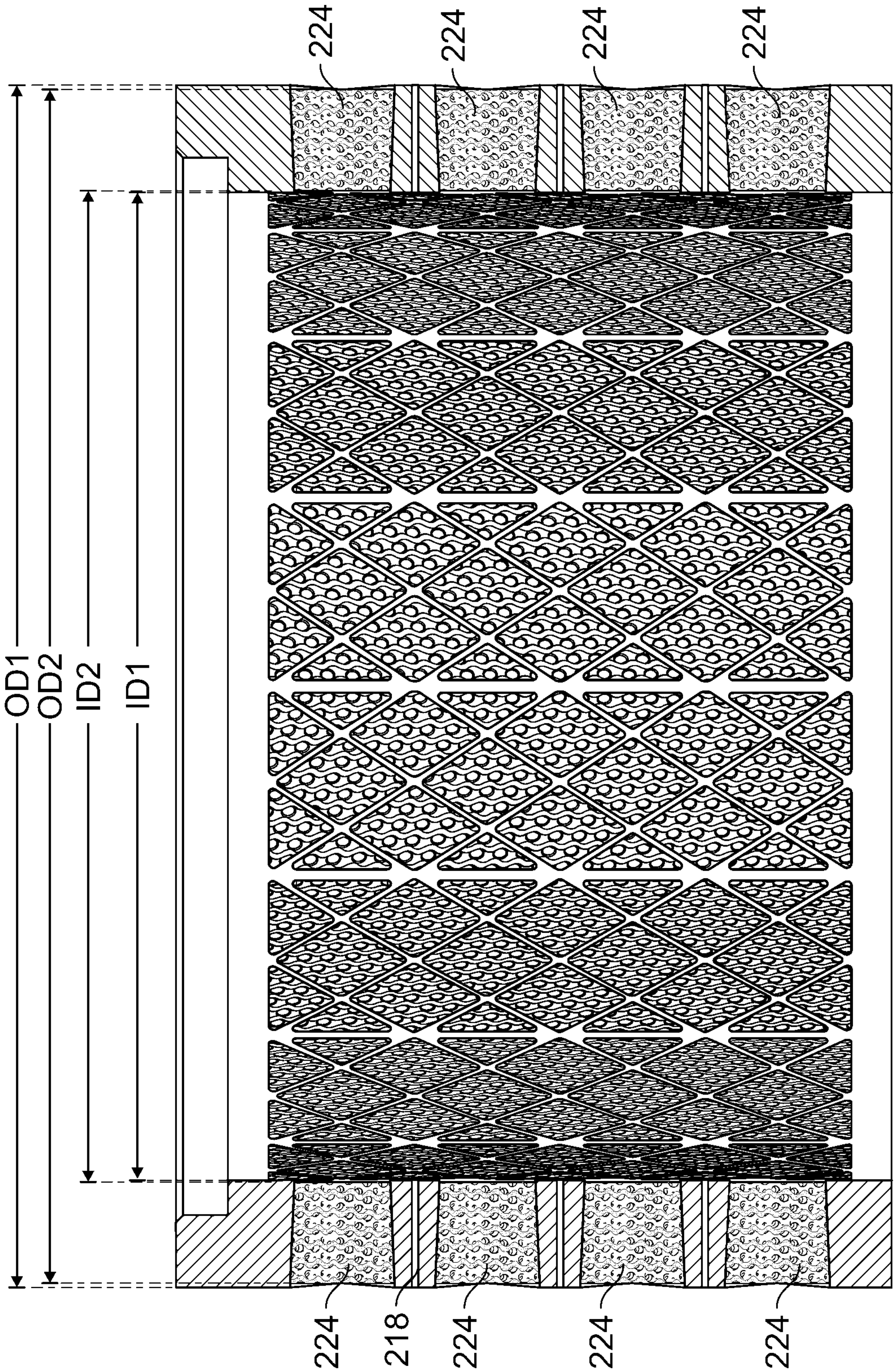
FIG. 6 is a cross-sectional view of the example cage of FIG. 2.

FIG. 6 is a cross-sectional view of the example cage 200. As shown in FIG. 6, the skeleton frame 218 has a first inner diameter ID1, and the lattice structure 224 has a second inner diameter ID2. The first inner diameter ID1 of the skeleton frame 218 is less than the second inner diameter ID2 of the lattice structure 224. This enables the skeleton frame 218 to form the guiding surface for the plug 118 (FIG. 1) to slide along, rather than sliding along the lattice structure 224.

As shown in FIG. 6, the skeleton frame 218 has a first outer diameter OD1, and the lattice structure 224 has a second outer diameter OD2. In this example, the first outer diameter OD1 of the skeleton frame 218 is greater than the second inner diameter OD2 of the lattice structure 224. Therefore, in this example, the skeleton frame 218 extends completely through and beyond the inner and outer sides of the lattice structure 224. In some examples, this enables the skeleton frame 218 to provide greater strength to the cage 200. In other examples, the skeleton frame 218 may extend further outward from the lattice structure 224 or may not extend beyond the lattice structure 224, examples of which are shown herein.

Figure 7A:
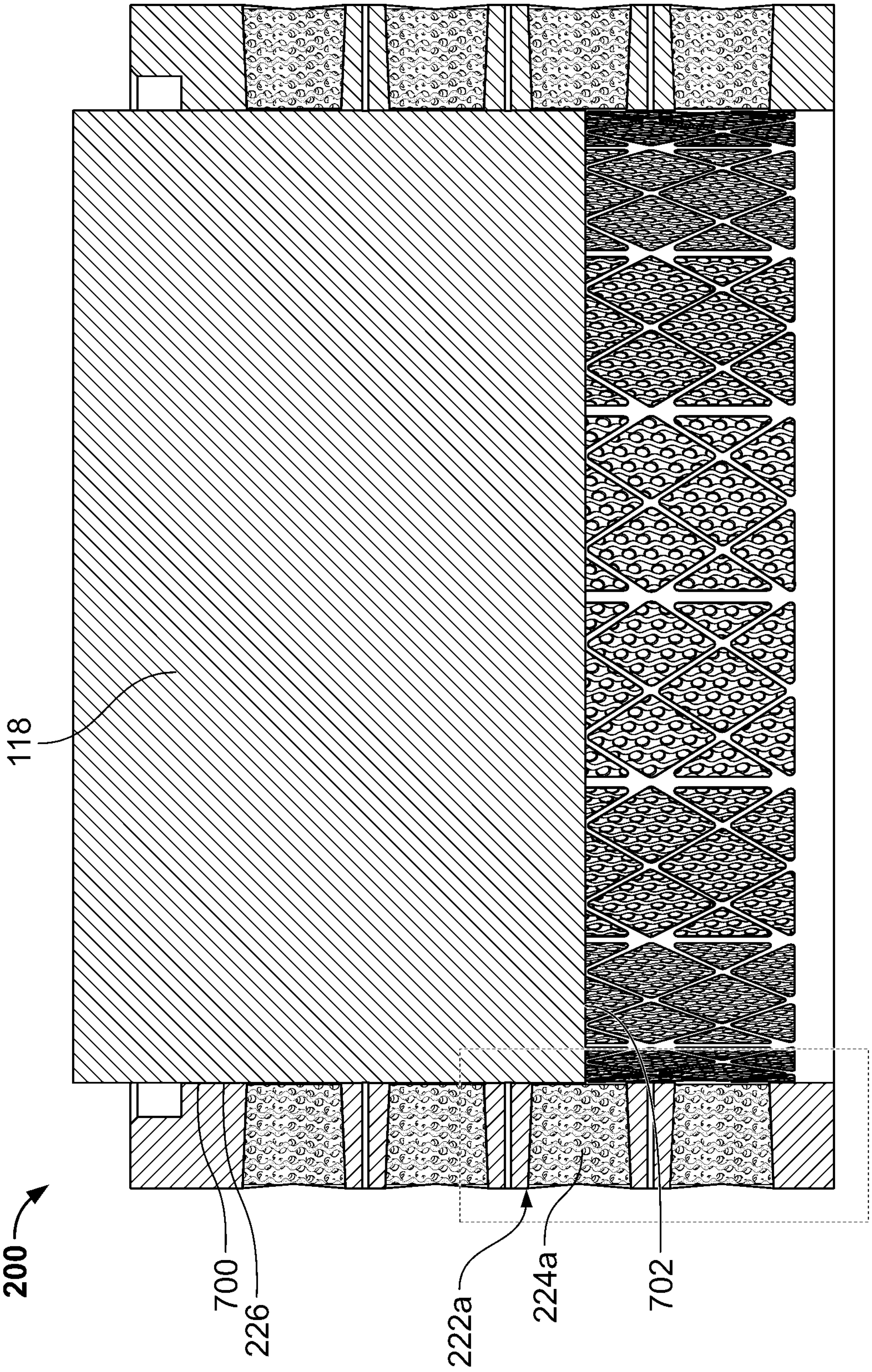
FIG. 7A is the cross-sectional view of FIG. 6 with an example plug in the example cage.

This configuration of the skeleton frame 218 also reduces (e.g., minimizes) clearance flow. For example, FIG. 7A shows the plug 118 in the cage 200 in a partially open position. The plug 118 has an outer surface 700 and a bottom side 702. The outer surface 700 is engaged with and slidable along the inner surface 226 of the skeleton frame 218. Therefore, the outer surface 700 of the plug 118 is guided along the inner surface 226 of the skeleton frame 218. Because the first inner diameter ID1 of the skeleton frame 218 is less than the second inner diameter ID2 of the lattice structure 224, the outer surface 700 of the plug 118 is spaced from (e.g., not engaged or in contact with) the lattice structure 224. In the illustrated example, the plug 118 is in a partially open position in which the bottom side 702 divides one of the windows (labeled **222*a*) and its corresponding lattice structure (labeled 224*a***).

Figure 7B:
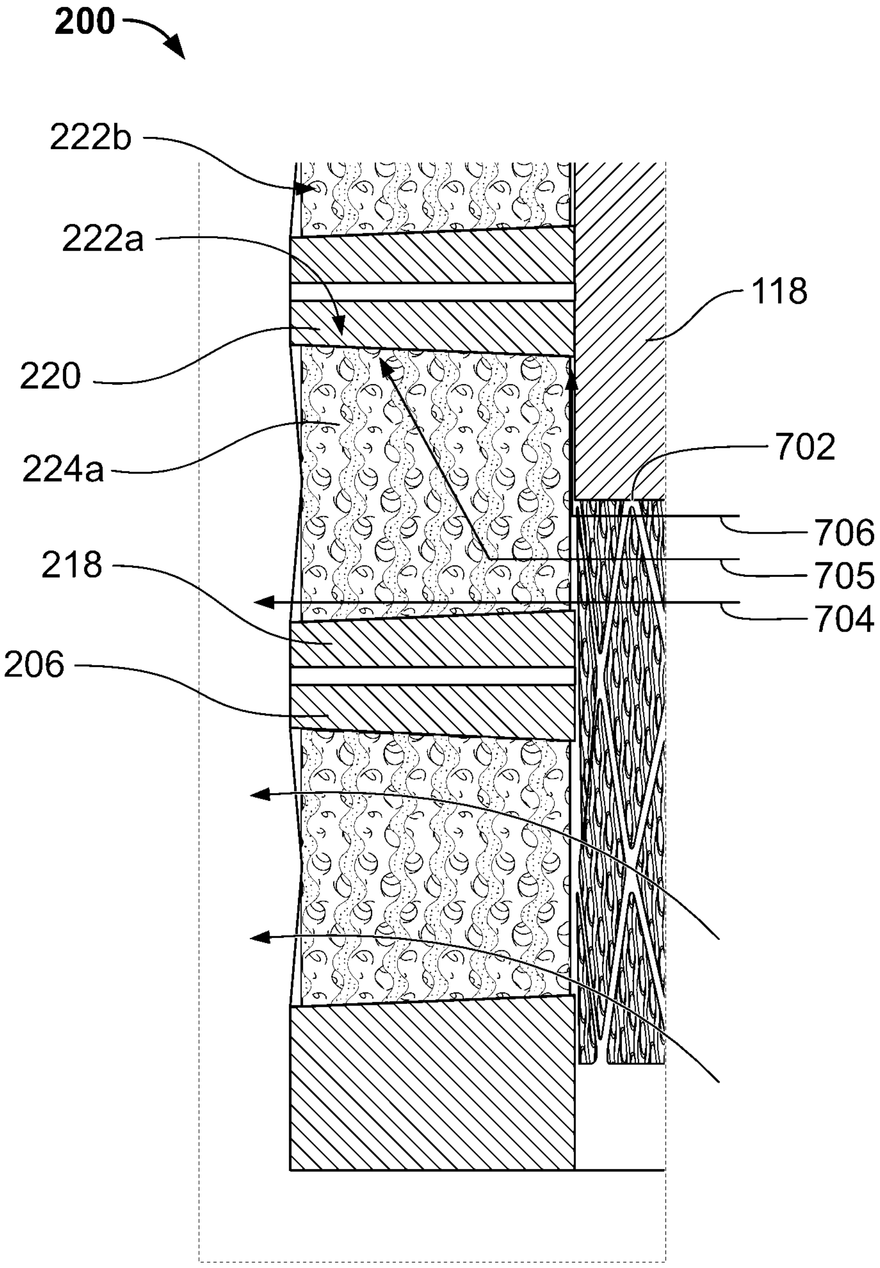
FIG. 7B is an enlarged view of the callout in FIG. 7A showing example flow lines through the example cage.

FIG. 7B is an enlarged view of the callout in FIG. 7A. As shown in FIG. 7B, the bottom side 702 of the plug 118 is about half way up the window **222*a* and the lattice structure 224*a*. As shown by the fluid flow line 704, fluid can flow through the bottom portion of the lattice structure 224*a* and, thus through the wall of the cage 200. Some of the fluid can also flow upward in the lattice structure 224*a*, as shown by the fluid flow line 705. This is sometimes referred to as up-flow. The up-flow is limited by the frame walls 220 of the skeleton frame 218, which prevents or limits the fluid from flowing into the next window (labeled) 222*b* above the bottom side 702 of the plug 118. The up-flow is blocked by the walls 220 and directed to flow radially outward through the lattice structure 224*a*. Further, as shown by the fluid flow line 706, some fluid can flow upward between the plug 118 and the lattice structure 224*a*, sometimes referred to as clearance flow. However, because the plug 118 is engaged with the walls 220 of the skeleton frame 218, this clearance flow is prevented from flowing into the next window (labeled 222*b*) by the skeleton frame 218. As such, the skeleton frame 218** reduces or limits clearance flow and up-flow.

The shape of the windows 222 also enables continuous, gradual increasing or decreasing of flow as the plug 118 is moved upward or downward. If the skeleton frame 218 had walls that were horizontal, there may be flat spots in the flow curve when opening/closing the plug 118. However, with the example pattern shown in FIGS. 2-7B, there is a continual opening/closing of the channels as the plug 118 is moved up or down. This enables finer control of the flow rate through the cage 200.

As disclosed above, in some examples, the cage 200 is constructed via additive manufacturing (e.g., 3D printing). For example, the cage 200 may be constructed by a 3D printer. Therefore, in some examples, the cage 200 is constructed of multiple layers of a same material (e.g., metal)

bonded or fused together. The cage 200 can be constructed of any material capable of being printed by a 3D printer. In some examples, the cage 200 is constructed of carbon steel, 316 stainless steel, cobalt chrome, aluminum, and/or titanium. In other examples, the cage 200 can be constructed of other materials. In some examples, additives or other components are added to make a raw material printable via 3D printing. 3D printing is advantageous because it can be used to form small, high density features, such as the lattice structure 224. As such, the openings 212 can be sized smaller than openings formed with other known machining techniques. In some examples, the cage 200 is constructed (e.g., printed) as a single unitary part or component. In other examples the cage 200 can be constructed as multiple parts or sections that are coupled together. For example, the first end portion 202, the second end portion 204, and the wall 206 can be constructed (e.g. printed) as separate components and then coupled (e.g., welded) together to form the cage 200.

Figure 8:
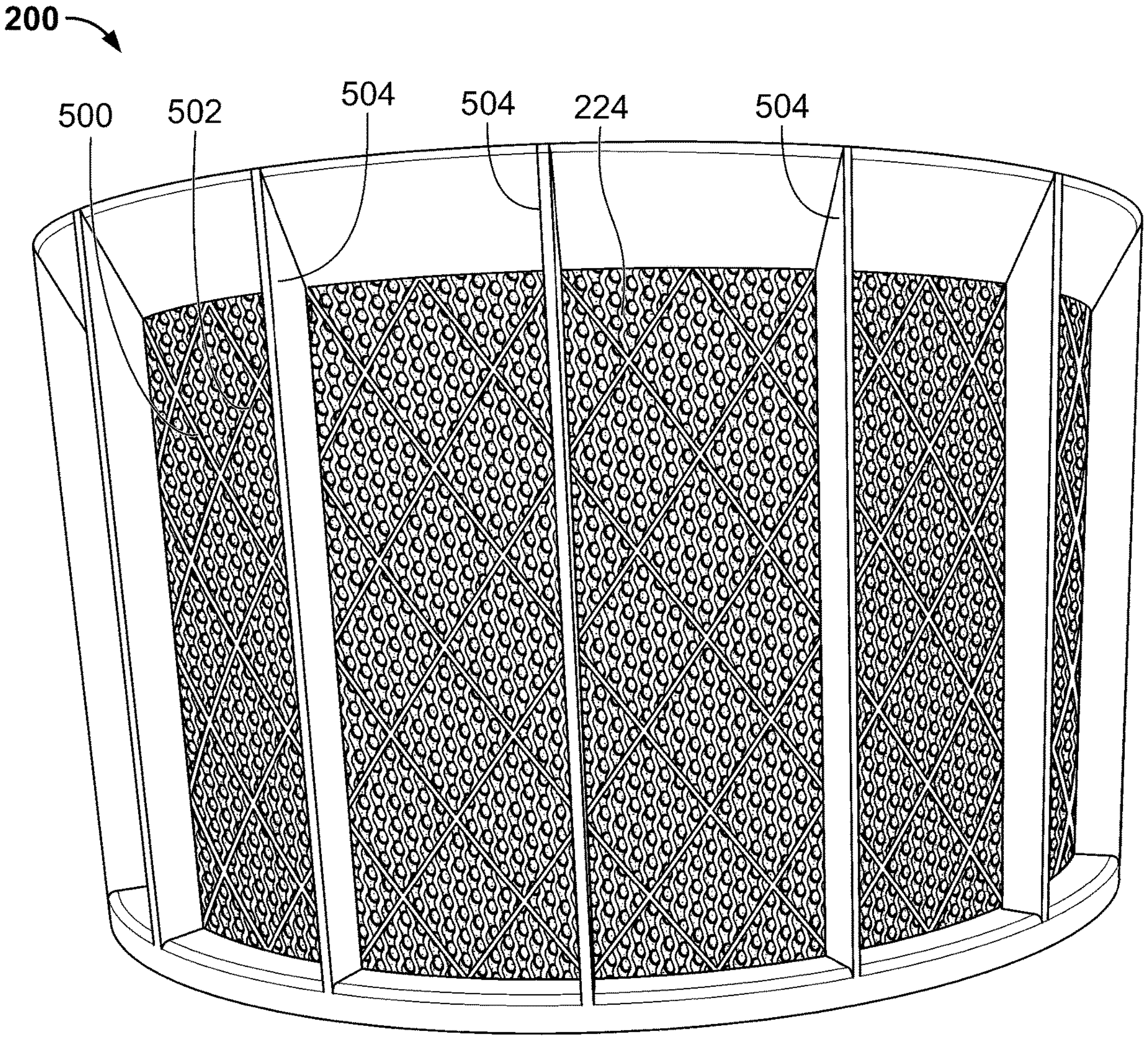
FIG. 8 is a perspective view of the example cage of FIG. 2 in which the example skeleton frame has enlarged vertical frame walls.

In some examples, the thickness (in the radial direction) of the frame walls 500, 502, 504 of the skeleton frame 218 and/or the lattice structure 224 can be larger or smaller. For example, FIG. 8 is a perspective view of the cage 200. In this example, the third set of frame walls 504 (three of which are referenced in FIG. 8) extend further outward (in the radial direction) from the first and second sets of frame walls 500, 502 (one of each is referenced in FIG. 8) and the lattice structure 224 (one of which is referenced in FIG. 8). In some examples, this configuration provides additional vertical support for loading.

Figure 9:
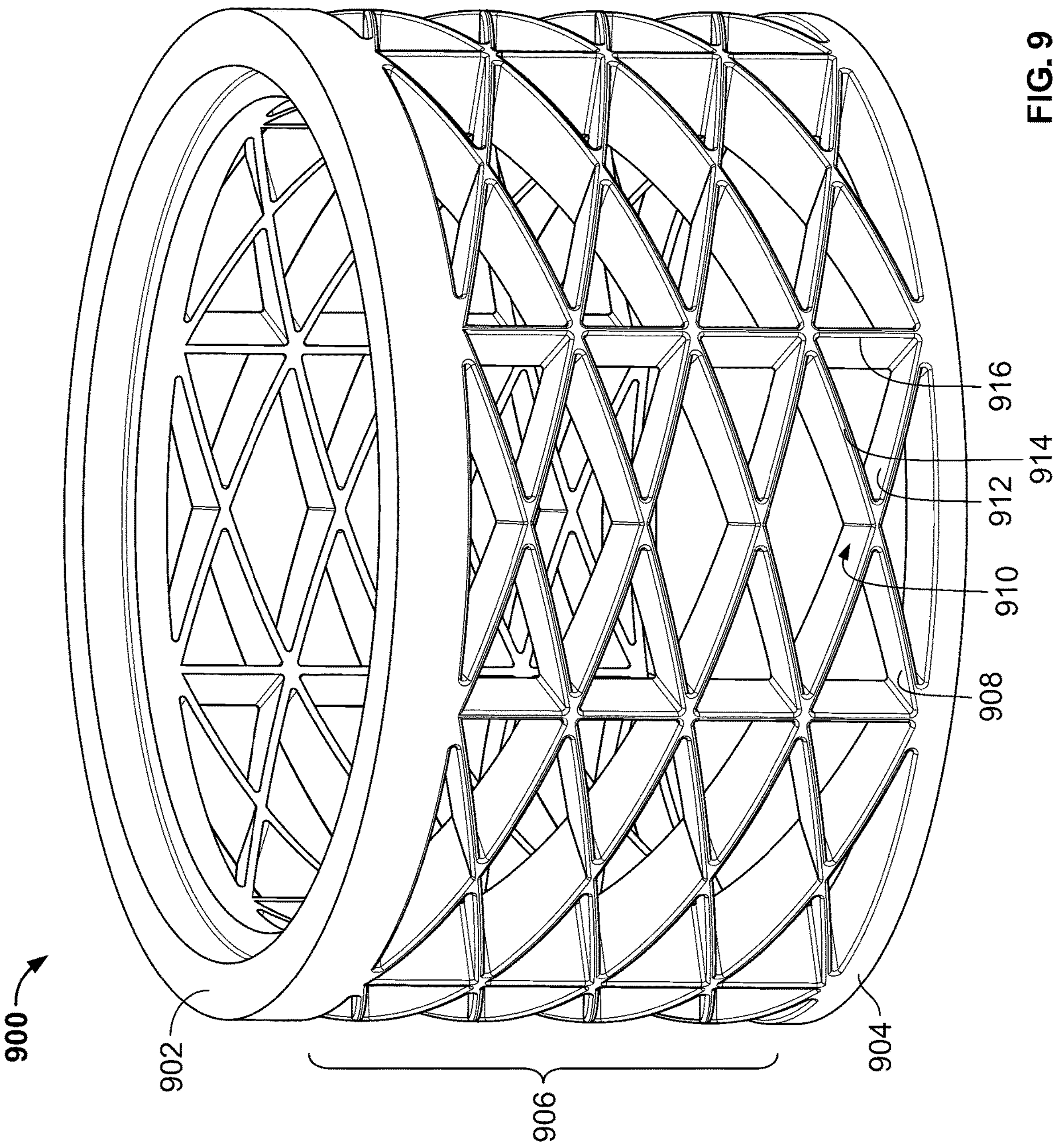
FIG. 9 is a perspective view of another example cage having an example skeleton frame with helical frame walls.

FIG. 9 is a perspective view of another example cage 900 that can be implemented in the example valve 100 of FIG. 1. The cage 900 includes a first end portion 902, a second end portion 904 opposite the first end portion 902, and a wall 906 between the first and second end portions 902, 904. The wall 906 has a skeleton frame 908 between the first and second end portions 902, 904. The skeleton frame 908 defines or forms a plurality of windows 910 (one of which is referenced in FIG. 9). In this example, the windows 910 are rhombus-shaped. The wall 906 can include lattice structure in each of the windows 910, similar to the cage 200 disclosed above. For clarity, the lattice structure is not shown in FIG. 9. However, any of the example aspects disclosed in connection with the lattice structure 224 of the cage 200 can likewise apply to the cage 900. Similar to the cage 200, the skeleton frame 908 has a smaller inner diameter than the lattice structure, which forms a guide surface for the plug 118 (FIG. 1).

In the illustrated example, the skeleton frame 908 is similar to the skeleton frame 218 disclosed above and has a first set of frame walls 912 (one of which is referenced in FIG. 9) arranged in a helical pattern angled in a first direction, a second set of frame walls 914 (one of which is referenced in FIG. 9) arranged in a helical pattern angled in a second direction, and a third set of walls 916 (one of which is referenced in FIG. 9) arranged in an axial direction. Similar to the skeleton frame 218, the skeleton frame 908 of FIG. 8 provides a guiding surface for the plug 118, provides strength to the cage 900, and reduces clearance flow. However, in this example, the frame walls 912, 914, 916 are spaced and/or angled differently than the frame walls of the skeleton frame 218. For instance, in this example, the third set of walls 916 are spaced apart by one of the windows 910 (or two half windows 910).

Figure 10:
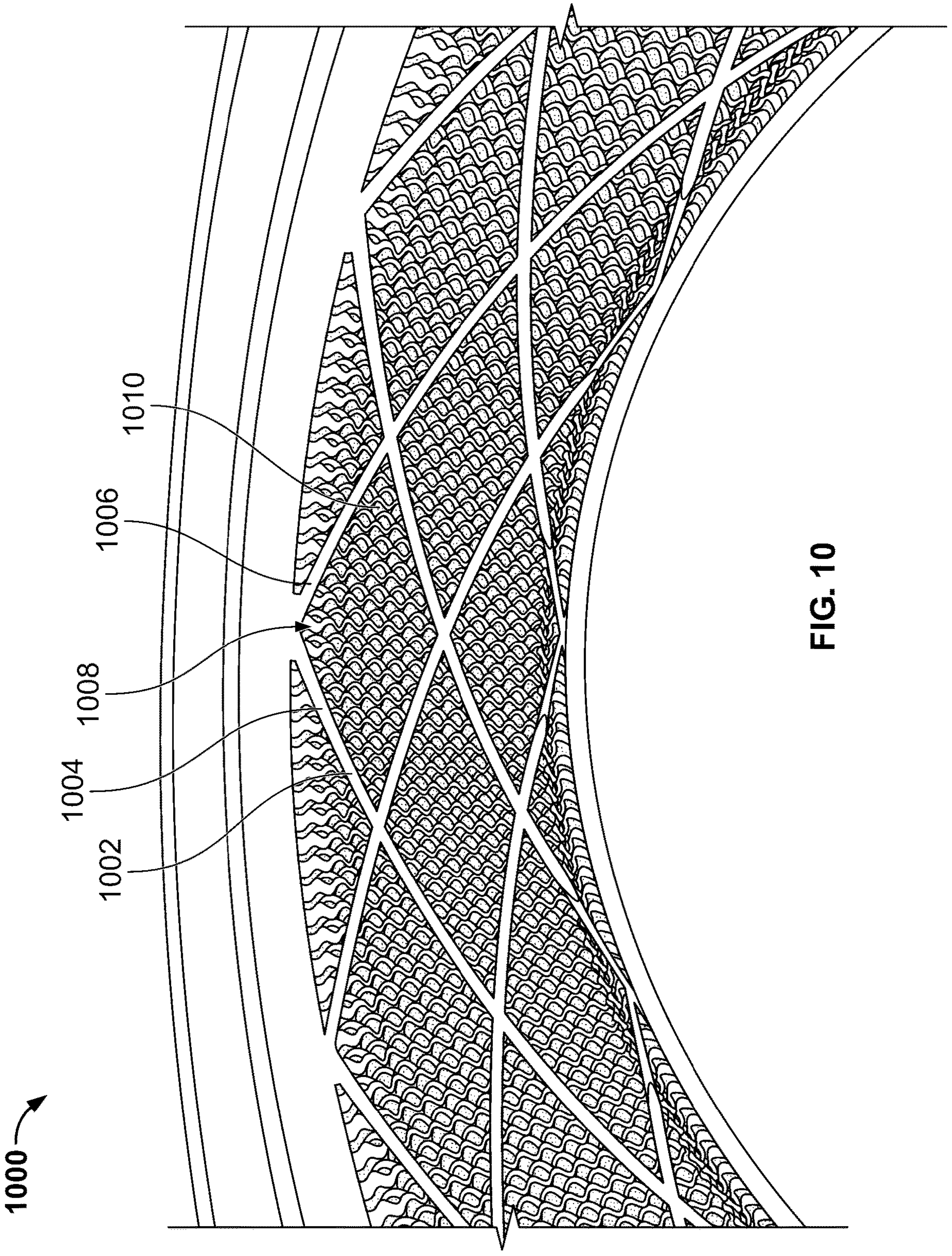
FIG. 10 is enlarged view of an inner surface of another example cage having another example skeleton frame with helical frame walls and without any vertical frame walls.

In some examples, a skeleton frame may not include vertical (axial) walls. For example, FIG. 10 is an inner view of an example cage 1000 with a skeleton frame 1002 without axial (vertical) walls. The skeleton frame 1002 has first and second sets of walls 1004, 1006 that form rhombus shaped windows 1008, similar to the skeleton frame 908. However, the skeleton frame 1002 does not include vertical walls. As shown in FIG. 10, the cage 1000 includes lattice structure 1010 in each of the windows 1008. The lattice structure 1010 forms or defines openings for fluid flow through the cage 1000.

In some examples, a skeleton frame may not extend beyond the outside of the lattice structure. For example, FIG. 11 shows an outer side 1100 of the cage 1000. In this example, the skeleton frame 1002 does not extend through the entire lattice structure 1010. Therefore the lattice structure 1010 forms the outer side 1100 of the cage.

Figure 12:
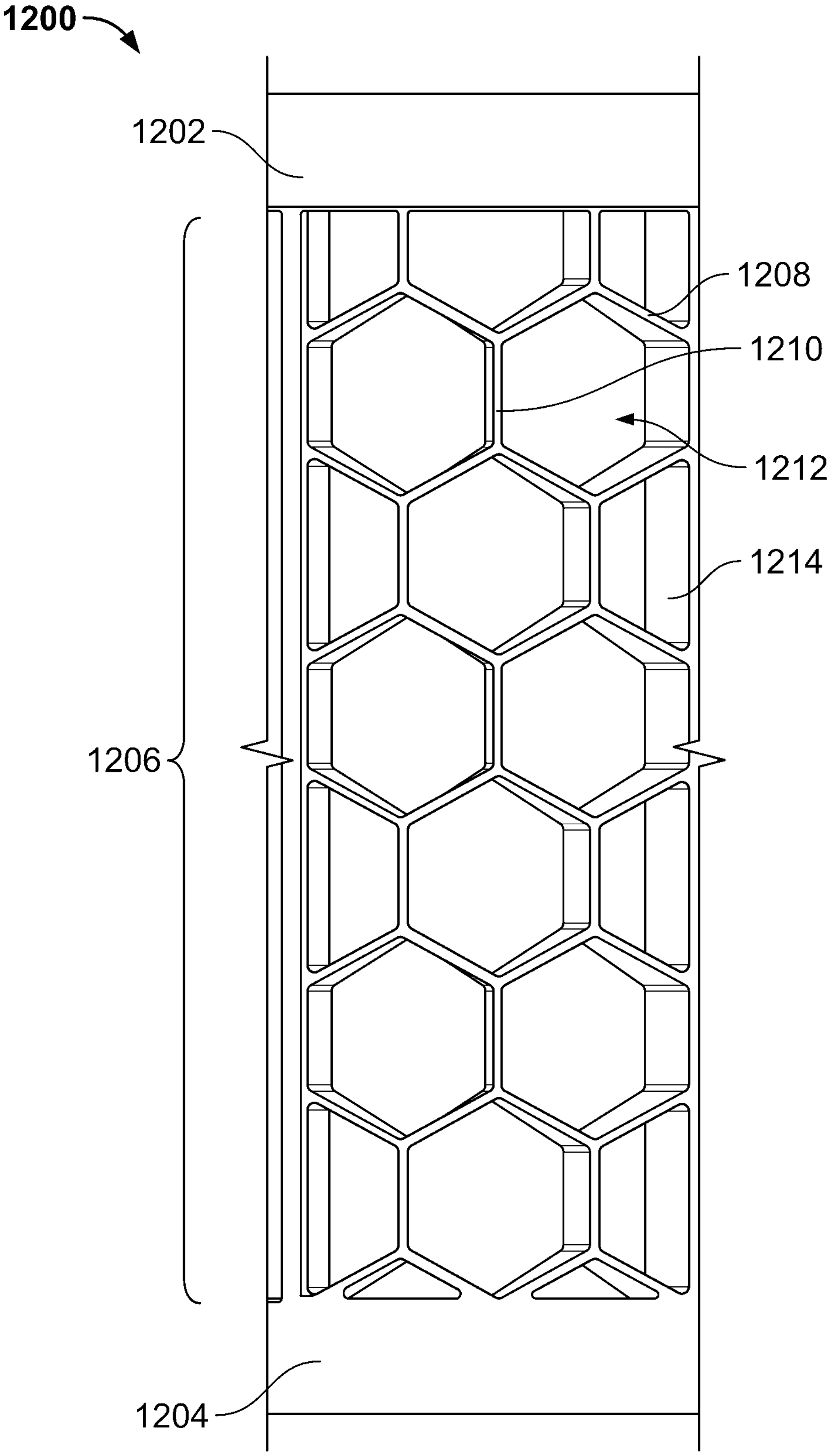
FIG. 12 illustrates a portion of an example cage having an example skeleton frame with polygonal frame walls.

FIG. 12 shows a portion of another example cage 1200 that can be implemented in the valve 100. The cage 1200 includes a first end portion 1202, a second end portion 1204, and a wall 1206 between the first and second end portions 1202, 1204. The wall 1206 includes a skeleton frame 1208 that forms or defines windows 1212. In this example, the skeleton frame 1208 has a first set of walls 1210 (one of which is referenced in FIG. 12) that are arranged in a polygonal configuration. In particular, in this example, the first set of walls 1210 are arranged in a hexagonal configuration. As such, at least a portion of the windows 1212 are polygonal, namely, hexagonal-shaped. In other examples, the first set of frame walls 1210 can be configured to form other polygonal-shaped windows. In the illustrated example, the skeleton frame 1208 also a second set of walls 1214 (one of which is referenced in FIG. 12) extending in the axial direction (e.g., the longitudinal or vertical direction) and intersecting certain ones of the first set of walls 1210. However, in other examples, the skeleton frame 1208 may not include the second set of frame walls 1214.

The wall 1206 can include lattice structure in each of the windows 1212, similar to the cage 200 disclosed above. For clarity, the lattice structure is not shown in FIG. 12. However, any of the example aspects disclosed in connection with the lattice structure 224 of the cage 200 can likewise apply to the cage 1200. Similar to the cage 200, the skeleton frame 1208 has a smaller inner diameter than the lattice structure, which forms a guide surface for the plug 118 (FIG. 1). The skeleton frame 1208 of FIG. 12 also provides strength to the cage 1200 and reduces clearance flow.

Figure 13:
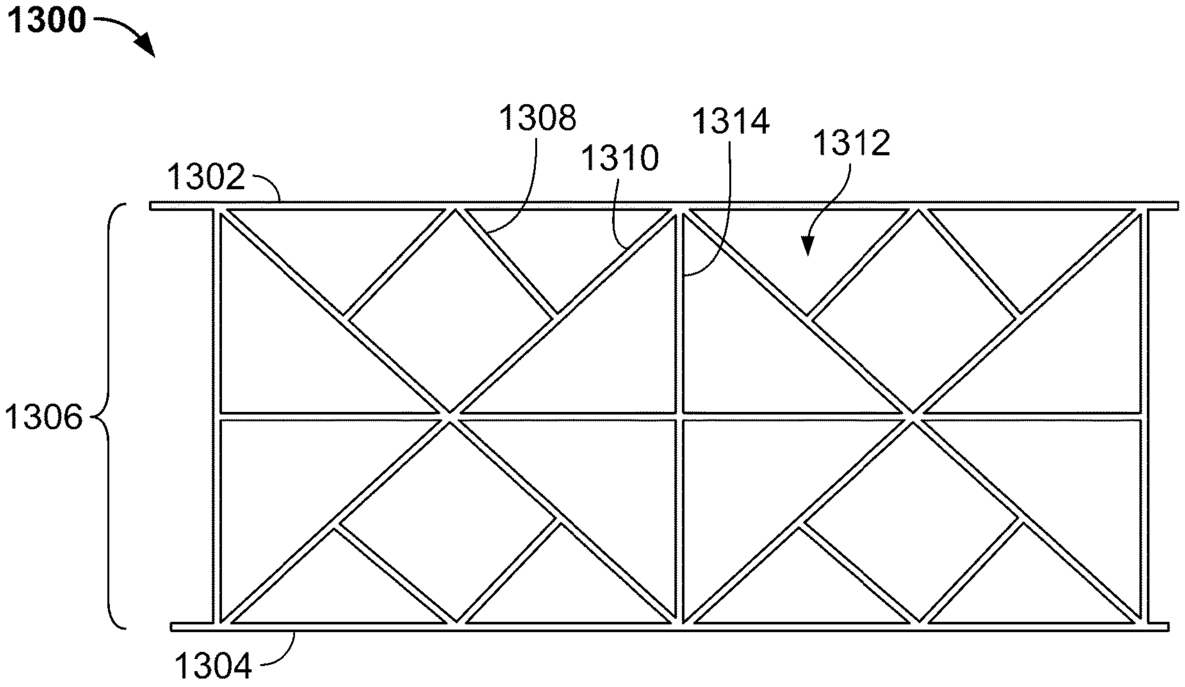
FIG. 13 illustrates a portion of an example cage having an example skeleton frame with polygonal frame walls.

FIG. 13 shows a portion of another example cage 1300 that can be implemented in the valve 100. The cage 1300 includes a first end portion 1302, a second end portion 1304, and a wall 1306 between the first and second end portions 1302, 1304. The wall 1306 includes a skeleton frame 1308. In this example, the skeleton frame 1308 has a first set of walls 1310 (one of which is referenced in FIG. 13) that are arranged in a polygonal configuration. In this example, the frame walls 1310 are arranged to form a plurality of windows 1312 having polygonal shapes, such as triangular and square shapes. In the illustrated example, the skeleton frame 1308 also a second set of walls 1314 (one of which is referenced in FIG. 13) extending in the axial direction (e.g., the longitudinal or vertical direction) and intersecting certain ones of the first set of walls 1310. The wall 1306 can include lattice structure in each of the windows 1312, similar to the cage 200 disclosed above. For clarity, the lattice structure is not shown in FIG. 13. However, any of the example aspects disclosed in connection with the lattice structure 224 of the cage 200 can likewise apply to the cage 1300. Similar to the cage 200, the skeleton frame 1308 has a smaller inner diameter than the lattice structure, which forms a guide surface for the plug 118 (FIG. 1). In this example, the arrangement or pattern of the frame walls 1310 provides relatively high strength, which can be advantageous in higher pressure valves with higher clamping forces. The example skeleton frame 1308 also reduces or limits clearance flow.

Figure 14:
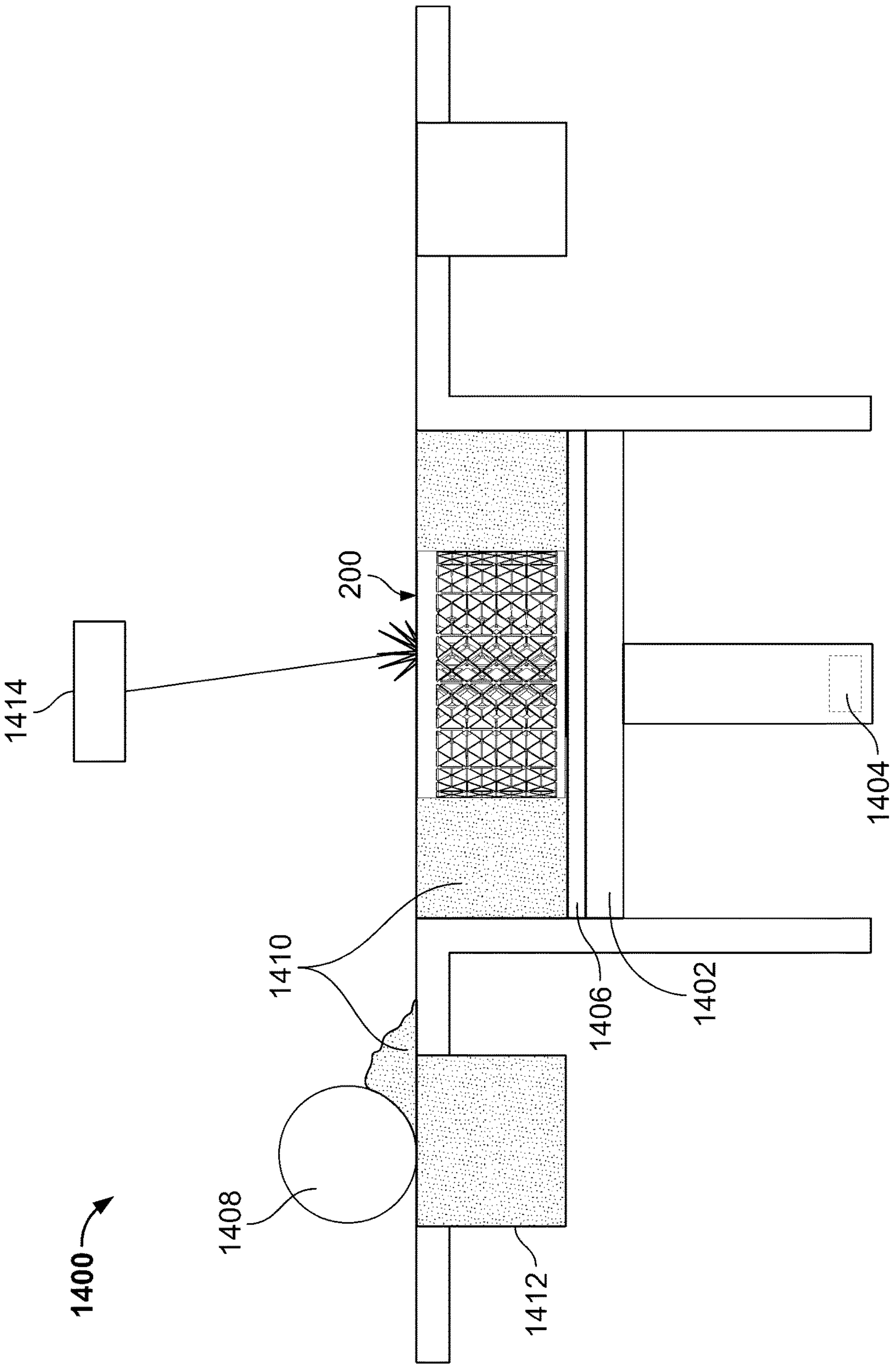
FIG. 14 illustrates an example additive manufacturing machine that can be used to form any of the example cages disclosed herein.

As disclosed herein, the example cages can be printed or formed via an additive manufacturing machine, commonly referred to as a 3D printer. FIG. 14 illustrates an example powder bed fusion machine 1400, which is a type of AM machine or 3D printer, that may be used to print or form any of the example cages. The powder bed fusion machine 1400 is described in connection with printing the cage 200, but can be similarly implemented to print any of the example cages 900, 1000, 1200, 1300 with other skeleton frames and/or lattice structures disclosed herein.

In the illustrated example, the powder bed fusion machine 1400 includes a build platform 1402 that is moveable up and down via a platform motor 1404. To create one or more objects, such as the cage 200, a substrate 1406 is placed on the build platform 1402. The substrate 1406 may be, for example, a sheet of metal such as stainless steel. Then, a roller 1408 spreads a thin layer (e.g., 40 microns) of powder material 1410 from a reservoir 1412 (e.g., a hopper) over a top of the substrate 1406 and the build platform 1402. The powder material 1410 can be any metal (e.g., stainless steel) and/or polymer based material. Then, a laser 1414 applies energy to the layer of powder material 1410 (in the shape of a cross-section of the 3D flame arrestor), which sinters, fuses, and/or otherwise hardens the powder material 1410 to form a layer of the cage 200. In this example, the first layer of the cage 200 is welded or sintered to the substrate 1406. Next, the build platform 1402 is moved downward a small amount, (e.g., 0.1 millimeter (mm)) via the platform motor 1404, and the roller 1408 spreads another layer of the powder material 1410 over the build platform 1402 and over the first hardened layer(s). The laser 1414 then applies energy to the powder material 1410 to harden the material onto the previous layer(s). This process is repeated to build the cage 200 layer-by-layer. Therefore, the cage 200 can be composed of multiple layers of a same material (e.g., stainless steel) bonded together. In this example, the cage 200 is built vertically starting from the second end portion 204.

Other types of powder bed fusion AM processes may be completed by a variety of techniques such as, for example, direct metal laser sintering, electron beam melting, selective heat sintering, selective laser melting, selective laser sintering, etc. Powder bed fusion methods use either a laser or electron beam to melt and fuse material powder together. While some of the example cages disclosed herein are described as being built by a powder bed fusion AM machine, any of the example cages disclosed herein can constructed with any other type of AM process or machine, such as VAT photopolymerisation, material jetting, binder jetting, material extrusion, sheet lamination, and/or directed energy deposition.

In some examples, after the cage 200 is formed, the inside of the cage 200 is machined to smooth the inner surface 226 of the skeleton frame 218. For example, a boring bar, flex-hone tool, a milling machine, and/or any other tool or machine can be used to smooth the inner surface 226 of the skeleton frame 218.

Figure 15:
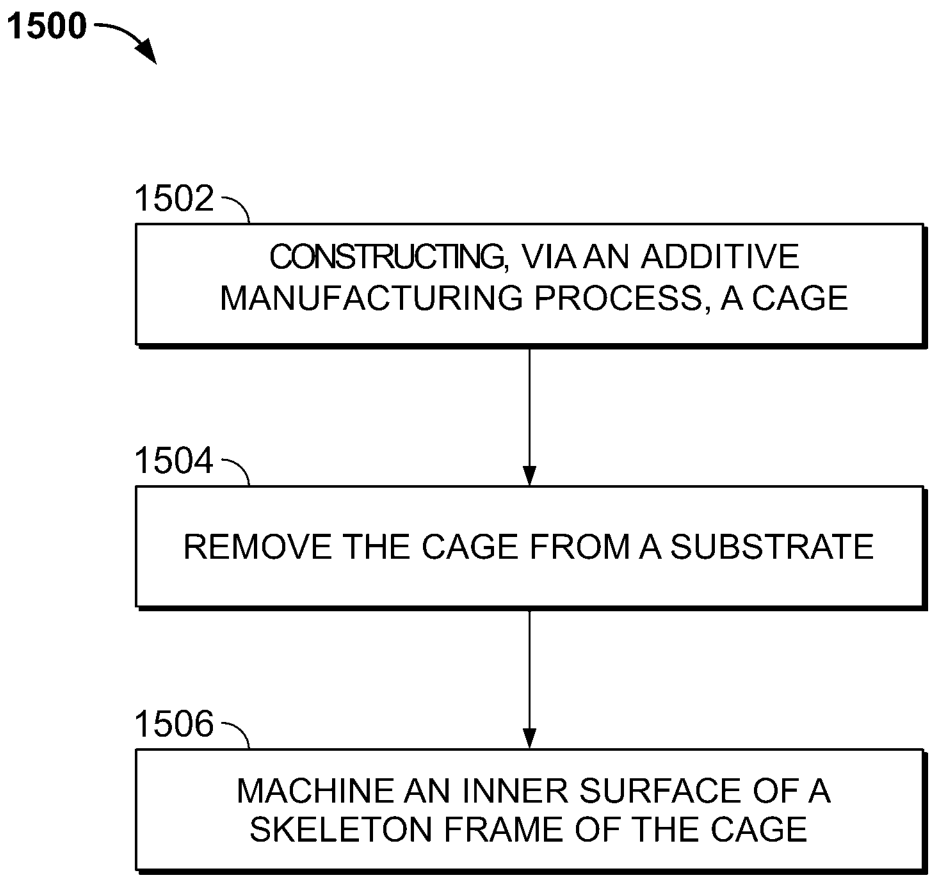
FIG. 15 is a flowchart representative of an example method of manufacturing an example cage.

FIG. 15 is a flowchart representative of an example method 1500 of manufacturing an example cage. The example method 1500 is described in connection with the example cage 200. However, it is understood that the example method 1500 may be similarly performed in connection with any other cage disclosed herein.

At block 1502, the example method 1500 includes constructing, via an additive manufacturing process, a cage. For example, the cage 200 can be constructed (e.g., printed) via a powder bed fusion process, such as shown in connection with the powder bed fusion machine 1400 of FIG. 14. In other examples, the cage 200 can be constructed (e.g., printed) via other types of additive manufacturing processes, such as Stereolithography (SLA), Selective Laser Sintering (SLS), fused deposition modeling (FDM), multi-jet modeling (MJM), VAT photopolymerisation, material jetting, binder jetting material jetting, material extrusion, sheet lamination, and/or directed energy deposition In some examples, the cage 200 is constructed (e.g., printed) layer-by-layer vertically from the second end portion 204 to the first end portion 202. In some examples, the cage 200 is constructed using stainless steel. In some example, multiple ones of the cage 200 can be constructed simultaneously on the substrate 1406 in a side-by-side configuration.

In some examples, the cage is constructed (e.g., printed) on a substrate, such as the substrate 1406. Therefore, at block 1504, the example method 1500 includes removing the cage 200 from the substrate 1406. For example, the cage 200 can be removed from the substrate 1406 via a cutting tool or machine. In some examples, the cage 200 is cut from the substrate 1406 along a cutting plane between the second end portion 204 and the substrate 1406.

At block 1506, the example method 1500 includes machining the inner surface 226 of the skeleton frame 218 to create smooth guide surface for the plug 118. The inner surface 226 can be machined using any known tool or machine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., “a”, “an”, “first”, “second”, etc.) do not exclude a plurality. The term “a” or “an” object, as used herein, refers to one or more of that object. The terms “a” (or “an”), “one or more”, and “at least one” are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus, and articles of manufacture that improve valve cages with lattice structure. Example cages disclosed herein include skeleton frames, which provide a guide surface for the plug. As such, the plug does not engage or contact the lattice structure. The skeleton frames also provide strength for the cage, which reduces loads on the cage during manufacture, assembly, and/or operation of the valve. Further, the example skeleton frames disclosed herein reduce clearance flow and up-flow, which enables better control of the flow rate through the cage. The example cages disclosed herein can be used with compressible or non-compressible fluids.

Examples and combinations of example disclosed herein include the following:

Example 1 is a cage for a valve, the cage comprising: a first end portion; a second end portion opposite the first end portion; and a wall between the first end portion and the second end portion. The wall includes a skeleton frame having a plurality of frame walls extending between the first end and the second end portion, the skeleton frame defining a plurality of windows; and lattice structure in the windows.

Example 2 includes the cage of Example 1, wherein a first inner diameter of the skeleton frame is less than a second inner diameter of the lattice structure.

Example 3 includes the cage of Examples 1 or 2, wherein a first outer diameter of the skeleton frame is greater than a second outer diameter of the lattice structure.

Example 4 includes the cage of any of Examples 1-3, wherein the cage is composed of multiple layers of a same material bonded together.

Example 5 includes the cage of any of Examples 1-4, wherein the cage includes stainless steel.

Example 6 includes the cage of any of Examples 1-5, wherein the lattice structure is a triply periodic lattice structure.

Example 7 includes the cage of any of Examples 1-6, wherein the frame walls include a first set of frame walls arranged in a helical pattern angled in a first direction and second set of frame walls arranged in a helical pattern angled in a second direction and intersecting the first set of frame walls.

Example 8 includes the cage of Example 7, wherein at least a portion of the windows are rhombus-shaped.

Example 9 includes the cage of Examples 7 or 8, wherein the frame walls include a third set of frame walls arranged in an axial direction and intersecting at least some of the first and second sets of frame walls.

Example 10 includes the cage of any of Examples 1-9, wherein at least a portion of the windows are hexagonal shaped.

Example 11 includes the cage of any of Examples 1-10, wherein at least a portion of the windows are polygonal shaped.

Example 12 is a valve comprising: a valve body defining a fluid passageway between an inlet and an outlet; a plug; and a cage in the fluid passageway, the plug disposed in the cage, the plug moveable in the cage to control fluid flow through the fluid passageway. The cage includes: a first end portion; a second end portion; and a wall between the first end portion and the second end portion, the wall including lattice structure and a skeleton frame with a plurality of frame walls extending into the lattice structure, the skeleton frame having a smaller inner diameter than the lattice structure.

Example 13 includes the valve of Example 12, wherein an outer surface of the plug is guided along an inner surface of the skeleton frame.

Example 14 includes the valve of Example 13, wherein the outer surface of the plug is spaced from the lattice structure.

Example 15 includes the valve of Examples 13 or 14, wherein an outer diameter of the lattice structure is greater than an outer diameter of the skeleton frame.

Example 16 includes the valve of any of Examples 12-15, wherein the frame walls include a first set of frame walls arranged in a helical pattern angled in a first direction and second set of frame walls arranged in a helical pattern angled in a second direction and intersecting the first set of frame walls.

Example 17 includes the valve of any of Examples 12-16, wherein the frame walls define a plurality of windows, wherein at least a portion of the windows are rhombus-shaped.

Example 18 includes the valve of any of Examples 12-17, wherein the frame walls define a plurality of windows, wherein at least a portion of the windows are polygonal-shaped.

Example 19 is a method comprising: constructing, via an additive manufacturing process, a cage for a valve, the cage including: a first end portion; a second end portion opposite the first end portion; and a wall between the first end portion and the second end portion, the wall including a skeleton frame extending between the first end portion and the second end portion and defining a plurality of windows, the wall including lattice structure in the windows.

Example 20 includes the method of Example 19, further including machining an inner surface of the skeleton frame to create a smooth guide surface for a plug of the valve.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A cage for a valve, the cage comprising:

a first end portion;

a second end portion opposite the first end portion; and a wall between the first end portion and the second end portion, the wall including:

a skeleton frame having a plurality of frame walls extending between the first end portion and the second end portion, the frame walls including a first set of frame walls arranged in a helical pattern angled in a first direction and second set of frame walls arranged in a helical pattern angled in a second direction and intersecting the first set of frame walls, the skeleton frame defining a plurality of windows; and lattice structure in the windows.

2. The cage of claim 1, wherein a first inner diameter of the skeleton frame is less than a second inner diameter of the lattice structure.

3. The cage of claim 1, wherein a first outer diameter of the skeleton frame is greater than a second outer diameter of the lattice structure.

4. The cage of claim 1, wherein the cage is composed of multiple layers of a same material bonded together.

5. The cage of claim 4, wherein the cage includes stainless steel.

6. The cage of claim 1, wherein the lattice structure is a triply periodic lattice structure.

7. The cage of claim 1, wherein at least a portion of the windows are rhombus-shaped.

8. The cage of claim 1, wherein the frame walls include a third set of frame walls arranged in an axial direction and intersecting at least some of the first and second sets of frame walls.

9. The cage of claim 1, wherein at least a portion of the windows are polygonal shaped.

10. A valve comprising:

a valve body defining a fluid passageway between an inlet and an outlet;

a plug; and a cage in the fluid passageway, the plug disposed in the cage, the plug moveable in the cage to control fluid flow through the fluid passageway, the cage including:

a first end portion;

a second end portion; and a wall between the first end portion and the second end portion, the wall including lattice structure and a skeleton frame with a plurality of frame walls extending into the lattice structure, the skeleton frame having a smaller inner diameter than the lattice structure, the frame walls including a first set of frame walls arranged in a helical pattern angled in a first direction and second set of frame walls arranged in a helical pattern angled in a second direction and intersecting the first set of frame walls.

11. The valve of claim 10, wherein an outer surface of the plug is guided along an inner surface of the skeleton frame.

12. The valve of claim 11, wherein the outer surface of the plug is spaced from the lattice structure.

13. The valve of claim 11, wherein an outer diameter of the lattice structure is greater than an outer diameter of the skeleton frame.

14. The valve of claim 10, wherein the frame walls define a plurality of windows, wherein at least a portion of the windows are rhombus-shaped.

15. The valve of claim 10, wherein the frame walls define a plurality of windows, wherein at least a portion of the windows are polygonal-shaped.

* * * * *